United States Patent
Branson et al.

(10) Patent No.: US 9,965,518 B2
(45) Date of Patent: May 8, 2018

(54) HANDLING MISSING DATA TUPLES IN A STREAMING ENVIRONMENT

(71) Applicant: International Business Machines Corporation, Armonk, NY (US)

(72) Inventors: Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 14/855,485

(22) Filed: Sep. 16, 2015

(65) Prior Publication Data

US 2017/0075959 A1   Mar. 16, 2017

(51) Int. Cl.
G06F 17/30 (2006.01)
H04L 29/08 (2006.01)

(52) U.S. Cl.
CPC .... *G06F 17/30498* (2013.01); *G06F 17/3056* (2013.01); *G06F 17/30516* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 5,517,668 A * | 5/1996 | Szwerinski | G06F 9/544 |
| | | | 709/201 |
| 6,128,640 A | 10/2000 | Kleinman | |
| 7,080,376 B2 | 7/2006 | Buch | |
| 7,093,249 B2 | 8/2006 | Melamed et al. | |
| 7,210,105 B2 | 4/2007 | Melamed et al. | |
| 7,548,937 B2 * | 6/2009 | Gu | G06F 17/30516 |
| 8,943,120 B2 * | 1/2015 | Branson | H04L 67/10 |
| | | | 709/201 |
| 8,972,480 B2 * | 3/2015 | Branson | H04L 67/10 |
| | | | 709/201 |
| 2002/0075857 A1 * | 6/2002 | LeBlanc | H04B 3/04 |
| | | | 370/352 |
| 2002/0124241 A1 | 9/2002 | Grey et al. | |
| 2008/0255847 A1 * | 10/2008 | Moriwaki | G10L 21/06 |
| | | | 704/270.1 |
| 2008/0263325 A1 | 10/2008 | Kudva et al. | |
| 2010/0332753 A1 | 12/2010 | Gray et al. | |
| 2013/0166617 A1 | 6/2013 | Branson et al. | |

(Continued)

*Primary Examiner* — Bai D. Vu
(74) *Attorney, Agent, or Firm* — Scott S. Dobson

(57) ABSTRACT

An operator graph is established for processing elements configured to perform operations on tuples of streaming data. A first processing element in the operator graph includes a barrier operator that joins output of upstream operators. It is determined that at least one timeout condition has occurred at the barrier operator and substitute data tuple values are generated for missing tuple output data from at least one of the upstream operators. A first barrier tuple output is generated by joining the substitute data tuple values with received data tuple values from the upstream operators. A copy of the received data tuple values is stored. It is determined that a set of one or more tuples received at the barrier operator includes the missing tuple output data. A second barrier tuple output is generated by joining the missing tuple output data values with the copy of the received data tuple values.

15 Claims, 10 Drawing Sheets

(56) References Cited

U.S. PATENT DOCUMENTS

2013/0290489 A1* 10/2013 Branson ............... H04L 67/104
  709/219
2013/0305034 A1* 11/2013 Branson ............... H04L 9/00
  713/150
2014/0089929 A1* 3/2014 Branson ............... H04L 69/22
  718/102

* cited by examiner

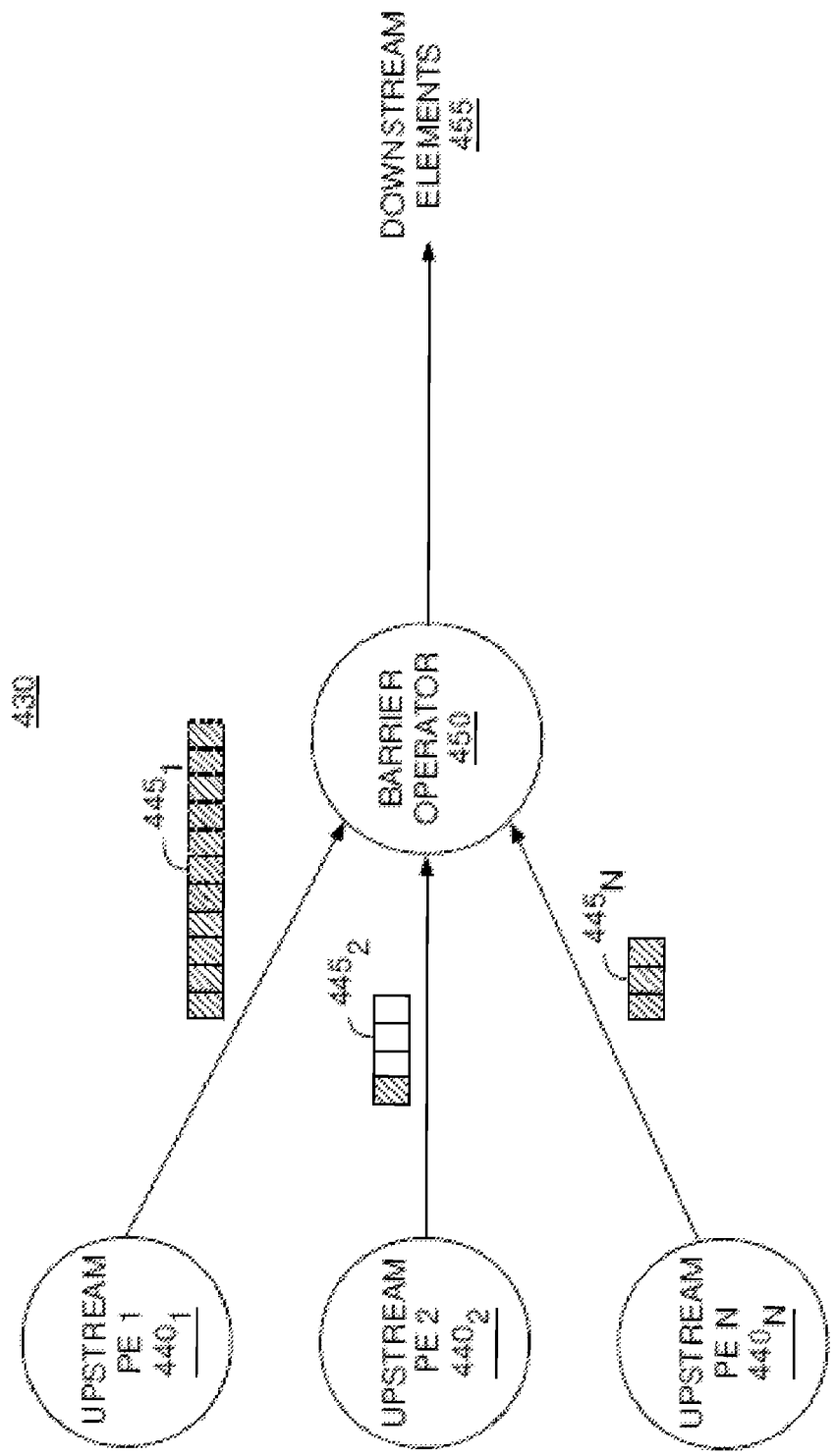

HANDLING MISSING DATA TUPLES IN A STREAMING ENVIRONMENT

BACKGROUND

The present disclosure relates generally to the field of stream computing, and more particularly to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

According to embodiments of the present disclosure a method for processing a stream of tuples is disclosed. The method includes establishing an operator graph for a plurality of processing elements that each include a respective one or more operators configured to perform a respective one or more operations on tuples of streaming data. The operator graph defines at least one execution path through the operators of the plurality of processing elements. A first processing element in the operator graph includes a barrier operator that joins output of a plurality of upstream operators included in the one or more of the plurality of processing elements. The method further includes determining at least one timeout condition has occurred at the barrier operator and generating, in response to the determining, substitute data tuple values for missing tuple output data from at least one of the plurality of upstream operators. The method further includes generating a first barrier tuple output by joining the substitute data tuple values with received data tuple values from the plurality of upstream operators. The method further includes storing a copy of the received data tuple values. The method further includes receiving, at the barrier operator and after the storing of the copy of the received data tuple values, a set of one or more tuples and determining the set of one or more tuples comprises the missing tuple output data. The method further includes generating a second barrier tuple output by joining the missing tuple output data values with the copy of the received data tuple values.

Additional embodiments of the present disclosure are directed to a system and a computer program product for performing the method described above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

FIGS. 4A-4B illustrate a computing infrastructure configured to execute a stream computing application including a barrier operator, according to one embodiment described herein.

DETAILED DESCRIPTION

Figure 1A:
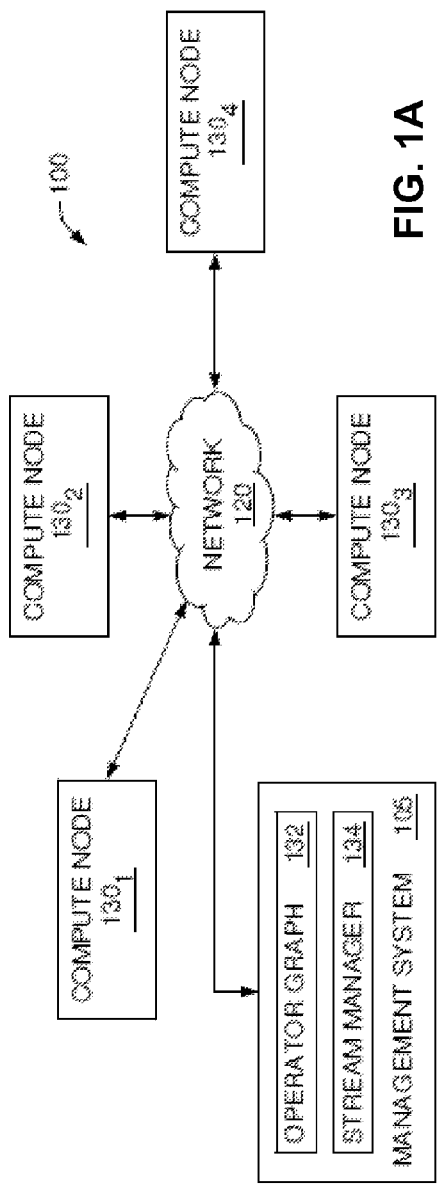
FIGS. 1A-1B illustrate a computing infrastructure configured to execute a stream computing application, according to one embodiment described herein.

The present disclosure relates to stream computing, and in particular, to computing applications that receive streaming data and process the data as it is received. While the present disclosure is not necessarily limited to such applications, various aspects of the disclosure may be appreciated through a discussion of various examples using this context.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream computing application, operators are connected to one another such that data flows from one operator to the next (e.g., over a TCP/IP socket). Scalability is reached by distributing an application across nodes by creating many small executable pieces of code (i.e., processing elements), each of one which contains one or more processing modules (i.e., operators). These processing elements can also be replicated on multiple nodes with load balancing among them. Operators in a stream computing application can be fused together to form a processing element. Additionally, multiple processing elements can be grouped together to form a job. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream computing application.

One advantage of stream computing applications is that they allow the user to granularly control the process flow of data through the application. In other words, the user may designate specific operators to perform various operations on the incoming data, and may dynamically alter the stream computing application by modifying the operators and the order in which they are performed. Additionally, stream computing applications are able to handle large volumes of data.

However, because stream computing applications often deal with large volumes of data, the processing of which is spread over multiple processing elements across multiple compute nodes, an operator may need to produce an output faster than it is able. Instead of requiring an operator to generate output data by processing currently received input data, an operator may instead output predetermined data. This predetermined data may be based on, for example, an average of the output data that was previously processed and transmitted by the operator. Moreover, the operator may only transmit predicted output data if the previously processed output data falls within an acceptable range. That is, if the previous output data is deterministic. An operator, or data flowing out of the operator, is "deterministic" if the values of the output data can be predicted with some minimum amount of confidence. For example, output data may be predictable or deterministic because a certain input always yields a certain output or because the output data typically has a value within a certain range—e.g., the output values for an operator are within a predefined range 80% of the time. Once the output data is deemed deterministic, using the predicted output data may allow the operator to transmit output data faster, or with less processing, than it otherwise would be able.

Moreover, the operator may output predetermined data only if there is a need to limit or stop processing received input data. For example, the stream computing application may be experiencing backpressure. "Backpressure" is a term used to describe one or more operators that are unable to transmit or receive additional data because either their buffer or a buffer associated with a downstream operator is full. In the case of some real-time applications, the operator may trade accuracy for increased data throughput where the time required for data to propagate through the stream computing application is an important factor.

Embodiments of the invention provide techniques for providing an enhanced barrier operator that is configured to intelligently join the outputs of one or more other operators. Embodiments receive streaming data to be processed by a plurality of processing elements, the processing elements processing at least a portion of the received data by operation of one or more computer processors. Additionally, an operator graph of the plurality of processing elements is established. Generally, the operator graph defines at least one execution path and where at least one of the processing elements of the operator graph is configured to receive data from at least one upstream processing element and transmit data to at least one downstream processing element. Further, a first processing element in the operator graph is configured with a barrier operator that joins the output of one or more upstream operators. Embodiments initiate one or more timeout conditions at the barrier operator. If embodiments determine that the one or more timeout conditions are satisfied before data has been received from each of the one or more upstream operators, output data is generated at the barrier operator without receiving the entirety of the data from at least one of the one or more upstream operators. Further, if the missing data is received at a later time, the previously missing data may be joined with the data that it was originally intended to be joined up with, or the previously missing data may be dropped from the operator graph.

Figure 1B:
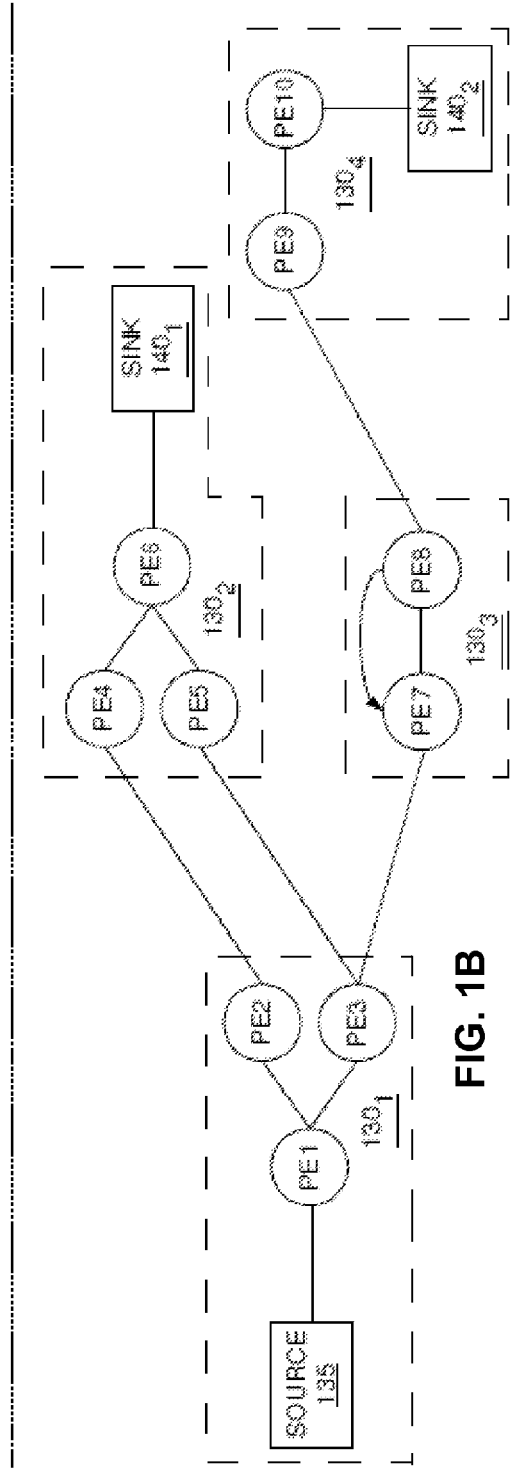

FIGS. 1A-1B illustrate a computing infrastructure configured to execute a stream computing application, according to one embodiment of the invention. As shown, the computing infrastructure 100 includes a management system 105 and a plurality of compute nodes $130_{1-4}$, each connected to a communications network 120. Also, the management system 105 includes an operator graph 132 and a stream manager 134. As described in greater detail below, the operator graph 132 represents a stream computing application beginning from one or more source processing elements (PEs) through to one or more sink PEs. This flow from source to sink is also generally referred to herein as an execution path. However, an operator graph may be a plurality of linked together executable units (i.e., processing elements) with or without a specified source or sink. Thus, an execution path would be the particular linked together execution units that data traverses as it propagates through the operator graph.

Generally, data attributes flow into a source PE of a stream computing application and are processed by that PE. Typically, processing elements receive an N-tuple of data attributes from the stream as well as emit an N-tuple of data attributes into the stream (except for a sink PE where the stream terminates). Of course, the N-tuple received by a processing element need not be the same N-tuple sent downstream. Additionally, the processing elements could be configured to receive or emit data in formats other than a tuple (e.g., the processing elements could exchange data marked up as XML documents). Furthermore, each processing element may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream computing application running on the compute nodes $130_{1-4}$, as well as to change the structure of the operator graph 132. The stream manager 134 may move processing elements (PEs) from one compute node 130 to another, for example, to manage the processing loads of the compute nodes 130 in the computing infrastructure 100. Further, stream manager 134 may control the stream computing application by inserting, removing, fusing, un-fusing, or otherwise modifying the processing elements (or what datatuples flow to the processing elements) running on the compute nodes $130_{1-4}$. One example of a stream computing application is IBM®'s InfoSphere® Streams (note that InfoSphere® is a trademark of International Business Machines Corporation, registered in many jurisdictions worldwide).

FIG. 1B illustrates an example operator graph that includes ten processing elements (labeled as PE1-PE10) running on the compute nodes $130_{1-4}$. Of note, because a processing element is a collection of fused operators, it is equally correct to describe the operator graph as execution paths between specific operators, which may include execution paths to different operators within the same processing element. FIG. 1B illustrates execution paths between processing elements for the sake of clarity. While a processing element may be executed as an independently running process with its own process ID (PID) and memory space, multiple processing elements may also be fused to run as single process or job (with a PID and memory space). In cases where two (or more) processing elements are running independently, inter-process communication may occur using a "transport" (e.g., a network socket, a TCP/IP socket, or shared memory). However, when processes are fused together, the fused processing elements can use more rapid communication techniques for passing tuples (or other data) among processing elements (and operators in each processing element).

As shown, the operator graph begins at a source 135 (that flows into the processing element labeled PE1) and ends at sink $140_{1\text{-}2}$ (that flows from the processing elements labeled as PE6 and PE10). Compute node $130_1$ includes the processing elements PE1, PE2 and PE3. Source 135 flows into the processing element PE1, which in turn emits tuples that are received by PE2 and PE3. Of note, although the operators within the processing elements are not shown in FIG. 1B, in one embodiment the data tuples flow between operators within the processing elements rather than between the processing elements themselves. For example, one or more operators within PE1 may split data attributes received in a tuple and pass some data attributes to one or more other operators within PE2, while passing other data attributes to one or more additional operators within PE3. Data that flows to PE2 is processed by the operators contained in PE2, and the resulting tuples are then emitted to PE4 on compute node $130_2$. Likewise, the data tuples emitted by PE4 flow to sink PE6 $140_1$. Similarly, data tuples flowing from PE3 to PE5 (i.e., from operator(s) within PE3 to operator(s) within PE5) also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which in turn emits tuples to be processed by sink PE10 $140_2$.

Furthermore, although embodiments of the present invention are described within the context of a stream computing application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

Figure 2:
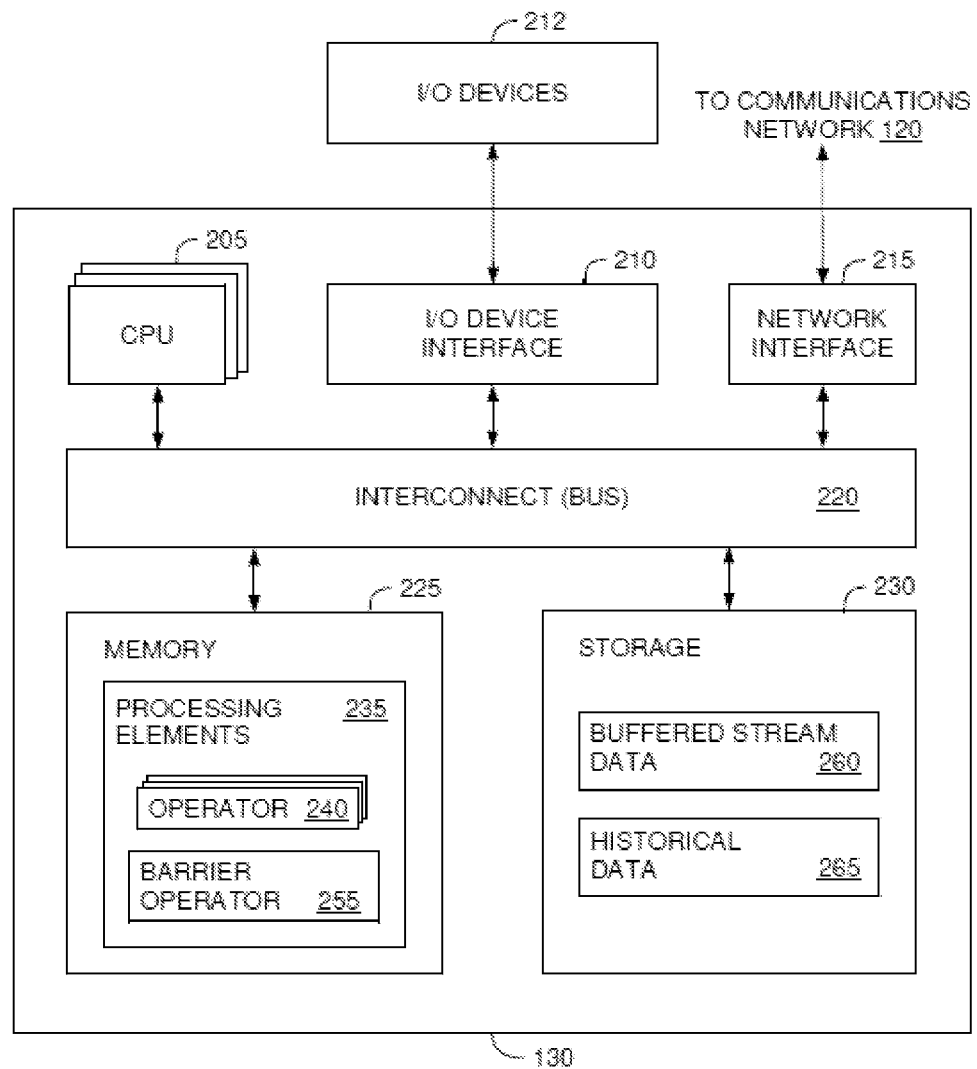
FIG. 2 is a more detailed view of the compute node of FIGS. 1A-1B, according to one embodiment described herein.

FIG. 2 is a more detailed view of the compute node 130 of FIGS. 1A-1B, according to one embodiment of the invention. As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. The memory 225 is generally included to be representative of a random access memory (e.g., DRAM or Flash). Storage 230, such as a hard disk drive, solid state disk (SSD), or flash memory storage drive, may store non-volatile data.

In this example, the memory 225 includes a plurality of processing elements 235. The processing elements 235 include a collection of operators 240 and a barrier operator 255. As noted above, each operator 240 may provide a small chunk of executable code configured to process data flowing into a processing element (e.g., PE 235) and to emit data to other operators 240 in that PE and to other processing elements in the stream computing application. Such processing elements may be on the same compute node 130 or on other compute nodes accessible over the data communications network 120. Generally, the barrier operator 255 is a specific type of operator that is configured to intelligently join the outputs of one or more other operators 240. Memory 225 may also contain stream connection data (not shown) which represents the connections between PEs on compute node 130 (e.g., a TCP/IP socket connection between two separate PEs 235), as well as connections to other compute nodes 130 with upstream and or downstream PEs in the stream computing application, also via TCP/IP sockets (or other inter-process data communication mechanisms).

As shown, storage 230 contains buffered stream data 260 and historical data 265. The buffered stream data 260 represents a storage space for data flowing into the compute node 105 from upstream operators (or from a data source for the stream computing application). For example, buffered stream data 260 may include data tuples waiting to be processed by an operator in one of the PEs 235—i.e., a buffer. Buffered stream data 260 may also store the results of data processing performed by upstream operators that will be sent to downstream operators. For example, a first operator may have to store tuples intended for a downstream operator if the first operator already has a full buffer, which may occur when the operator graph is experiencing backpressure. Storage also contains historical data 265, which represents previous output values from the various operators in the stream computing application. Such historical data 265 could be used, for instance, to determine a substitute output for a particular operator which could be used as output for the operator instead of the normal output from the operator processing current input values. Such substitute output can be, for example, the average of a plurality of previously computed output values or the output value that corresponds to a particular input value received by the operator.

Figure 3:
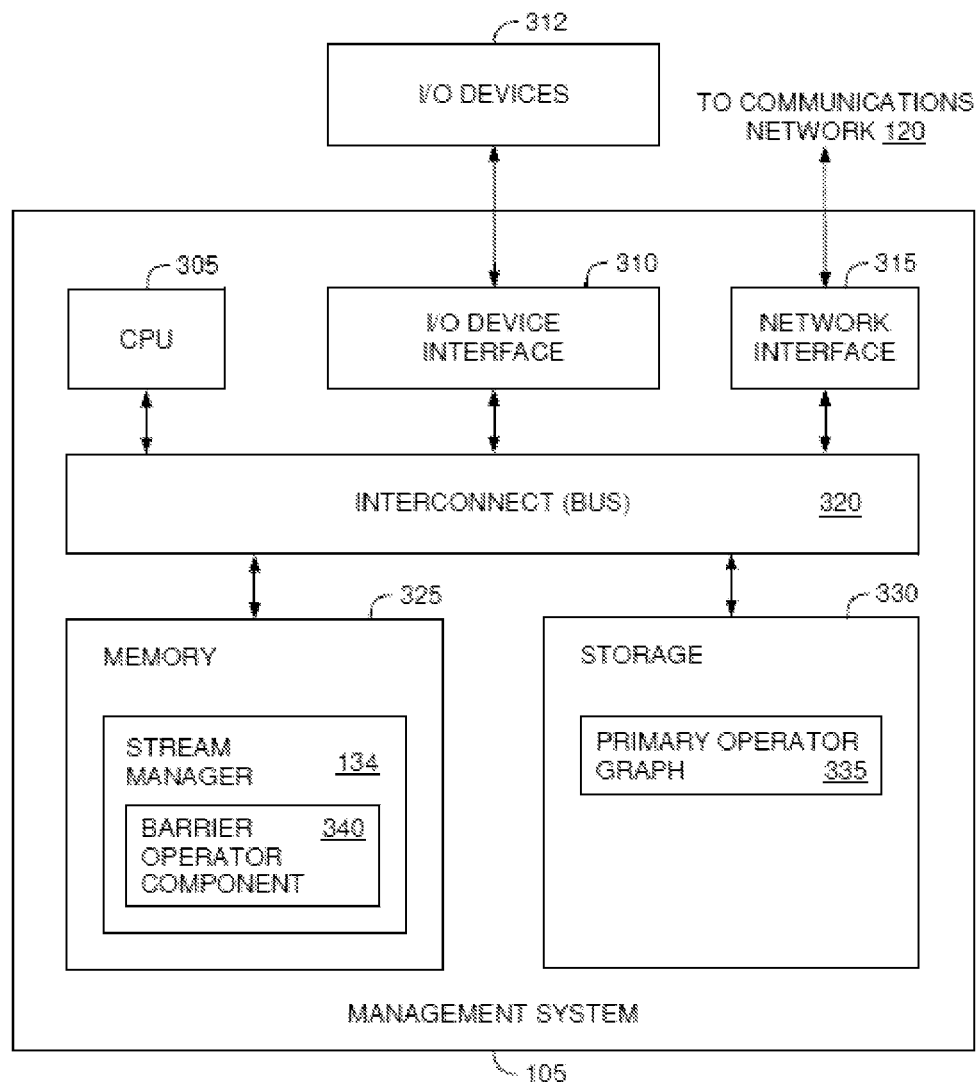
FIG. 3 is a more detailed view of the server computing system of FIG. 1, according to one embodiment described herein.

FIG. 3 is a more detailed view of the server computing system 105 of FIG. 1, according to one embodiment of the invention. As shown, server computing system 105 includes, without limitation, a CPU 305, a network interface 315, an interconnect 320, a memory 325, and storage 330. The client system 130 may also include an I/O device interface 310 connecting I/O devices 312 (e.g., keyboard, display and mouse devices) to the server computing system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. Additionally, the storage 330 includes a primary operator graph 335. The stream manager 134 may use the primary operator graph 335 to route tuples to PEs 235 for processing. The stream manager 134 also includes a barrier operator component 340. As discussed above, a barrier operator (e.g., barrier operator 255) is an operator configured to join the outputs of one or more upstream operators. The barrier operator may further be configured to wait on a requisite amount of data from each of the upstream operators before joining the outputs. For example, a particular barrier operator could be configured to join 10 tuples of data from a first upstream operator together with 5 tuples from a second upstream operator. The barrier operator component 340 may be configured to initiate one or more timeout conditions until the next set of outputs from upstream operators are processed. For example, the barrier operator component 340 could initiate a timer configured to expire after a predetermined period of time as one of the timeout conditions. As another example of a timeout condition, the barrier operator component 340 could monitor a backlog of data and upon determining the backlog exceeds a threshold amount of data (e.g., measured in tuples), the barrier operator component 340 could determine that the timeout condition is satisfied.

If a requisite amount of data is received from each of the upstream operators before any of the timeout conditions are satisfied, the barrier operator joins the received data into one or more output tuples and transmits the output tuples to one or more downstream operators. On the other hand, if the barrier operator component 340 determines that one or more of the timeout conditions are satisfied before the entirety of the data from the upstream operators is received at the barrier operator, the barrier operator component 340 may generate an output at the barrier operator without having received all of the data from the upstream operators. That is, if the barrier operator has received data from all the relevant upstream operators except one, the barrier operator component 340 could join the received data with substitute output data for the one operator. The barrier operator component 340 could transmit the joined data to one or more downstream operators, and could then re-initiate the one or more timeout conditions and begin waiting on the next window of data from the upstream operators.

For example, the barrier operator component 340 could be configured with logic for generating predicted output data for the upstream operators. The barrier operator component 340 may use previously transmitted output data from each of the upstream operators as well as current or previously received input data from the operators to determine predicted output data. For example, the barrier operator component 340 may compute the average for a plurality of previously transmitted output values or determine the mode—i.e., most frequently used—of the output values. The barrier operator is then able to join the predicted output data with any data already received from the upstream operators. Advantageously, doing so provides an enhanced barrier operator that can avoid delays within the stream computing application through intelligent use of substitute output values (e.g., predictive output values).

In one embodiment, the barrier operator component 340 is configured to use a predetermined substitute output value for a given operator. For instance, the barrier operator component 340 could be configured to use a default value as a substitute output for a particular operator. As another example, the barrier operator component 340 could be configured to use an error code message as a substitute output, the error code message describing the conditions under which the substitute output is generated (e.g., which timeout condition(s) are satisfied, an amount of data received from the upstream operators, and so on). Additionally, although the above example describes an embodiment in which substitute output is used when any of the initiated timeout conditions are satisfied before the output data from the upstream operators is received, one of ordinary skill in the art will recognize that numerous other configurations are possible. For example, the barrier operator component 340 could be configured to use substitute outputs only in the situation where all of the timeout conditions are satisfied before the requisite amount of data from the upstream operators is received, or the barrier operator component 340 could be configured to use substitute output values when a particular number of timeout conditions are satisfied (e.g., two or more timeout conditions are satisfied) before the upstream data is received.

Additionally, operators in the operator graph may have a requisite amount of data to be received from upstream operators before the operators can begin normal processing operations. In one embodiment, the requisite amount of data is represented as a window of data. For instance, the window of data could be, without limitation, a tumbling window of data or a sliding window of data. A tumbling window includes a one or more tuples (i.e., a chunk of divisible data) that after being processed by an operator 240 are discarded. In contrast, a sliding window may include tuples that were processed in a previously triggered sliding window.

For example, assume that a first operator is configured to use a tumbling window and a second operator is configured to use a sliding window. Further assume that both the first and second operators have received four initial tuples T1, T2, T3 and T4, such that each operator has a buffer of {T1, T2, T3, T4}, and that the windowing parameters associated with the operator instructs the window activator to trigger a window once the buffer reaches a size of four tuples. Note that, in other embodiments, the operator can also be configured to trigger a window after a particular time period has elapsed.

After the window is triggered and the operator 240 evaluates the tuples within the window, the tuples within a tumbling window are discarded. Accordingly, when the next tuple of T5 is received by the first operator, the operator discards the previously received tuples T1, T2, T3 and T4 and stores the new tuple T5 in the buffer. Thus, the buffer of the first operator at this time is {T5}. The first operator in this example would then store subsequently received tuples in the buffer until a new window is triggered (e.g., after the buffer reaches a size of four tuples, after a particular period of time has elapsed, etc.)

In contrast, the second operator using a sliding window technique maintains a portion of the tuples in its buffer when subsequent tuples are received after a window is triggered. Like with tumbling windows, a sliding window may trigger initially based on whether the requisite number of tuples are received or if the predefined period of time has expired.

However, unlike a tumbling window, a sliding window may trigger a window each time a subsequent tuple is received after the initial window is triggered. For example, if a stream application wants a four minute moving average of a stock ticker that is sampled every minute, the window activator for an operator could wait four minutes until four minutes worth of data arrives at the buffer and then could trigger a new window each time a new tuple is received or another minute passes. For purposes of the present example, assume that the second operator is configured to trigger a window after four tuples of data are received and thus triggers after the buffer contains the tuples {T1, T2, T3, T4}. When the second operator then receives the subsequent tuple T5, the second operator may expel one or more of the tuples from the previous window (e.g., the oldest tuple T1), but may include one or more of the tuples in the previous window in the new window. Thus, after receiving the tuple T5, the second operator could expel the tuple T1 from the buffer and could trigger a second window with the buffer {T2, T3, T4, T5}. Upon receiving the subsequent tuple T6, the second operator could expel the tuple T2, having a buffer of {T3, T4, T5, T6}, and so on.

Additionally, the window activator may wait for multiple time periods to pass, or multiple tuples to be received, before triggering a new sliding window. For example, the window activator may wait four time periods before triggering the first window but triggers a new sliding window every two time periods thereafter. Of course, all of the above examples are provided without limitation and are for illustrative purposes only. More generally, any form of a requisite amount of data or a window of data may be used in accordance with the embodiments described herein.

In some embodiments, the missing data, for which the substitute data values were generated, is received by the barrier operator component 340 at a later time and that missing data may be joined with the data values it was originally intended to be joined with. In some embodiments, after a timeout condition when substitute data values are joined with received data values, a copy of the received data values are stored for a period of time. If the missing data is received within the period of time, the missing data values can be joined with the stored data values to create a tuple output. Additionally, in some embodiments, tuples with substitute data values may be invalidated if the tuples are still in the operator graph when the missing data is received. In some embodiments, if the tuples with the substitute data have left the operator graph, stored values based on these tuples may be overwritten using the missing data values.

In some embodiments, the barrier operator component 340 may be configured to add a unique identifier to its output tuples that contain substitute values. The identifier may be included in the substitute data or may be added separately. This identifier may be used to track the substitute data tuple values through the operator graph and, in some embodiments, the identifier is used to identify stored data based on the substitute data tuple values that have left the operator graph. The unique identifier may be used to identify and invalidate the tuples containing the substitute values. If the substitute data has left the operator graph, the unique identifier may be used to replace data that has been stored with the unique identifier.

Alternatively, in some embodiments, the barrier operator component may be configured to drop the missing data when it is received (i.e. the data may be deleted or otherwise not passed on to downstream operators).

The barrier operator component 340 may be configured to identify when data received is missing data in many different ways. In some embodiments, barrier operator component 340 may be configured to identify receipt of missing data based on historical output received. For example, consider a barrier operator that typically receives 5 tuples from a given upstream operator every minute. In the first minute, the barrier operator may receive 5 tuples. In the second minute, the barrier operator does not receive any tuples from the upstream operator and a timeout condition occurs. In the third minute, 10 tuples are received. The barrier operator may be configured to identify the first 5 tuples as containing the missing data.

In some embodiments, the barrier operator component 340 may be configured to identify missing data based on timestamps assigned to each tuple. For example, if a tuple is received with a timestamp that is not consistent with tuples received around the same time, it may be identified as containing missing data. In another example, if the timestamp of a missing tuple may be generally known based on tuples received prior to missing a tuple, and thus, an incoming tuple with this timestamp may be identified as containing missing data.

In other embodiments, the barrier operator component 340 may be configured to perform attribute pattern matching to determine that a tuple contains missing data. For example, the tuples received prior to not receiving a tuple may indicate an attribute pattern to predict the next tuple that is missing. A tuple that is received later may match the attribute pattern and be identified as containing the missing data.

In some embodiments, barrier operator component 340 may be configured to log all incoming data into a holding storage once the barrier operator starts missing data from one of the upstream operators. Thus, when the appropriate ratio of data from each of the streams is in the holding storage, the data received from the upstream operators is in sync (i.e. joining data in the order it is received should result in data being joined that is intended to be joined). Further, barrier operator component 340 may be configured to generate output using the holding storage once it is in sync if the barrier operator component has been joining misaligned data.

Figure 4A:
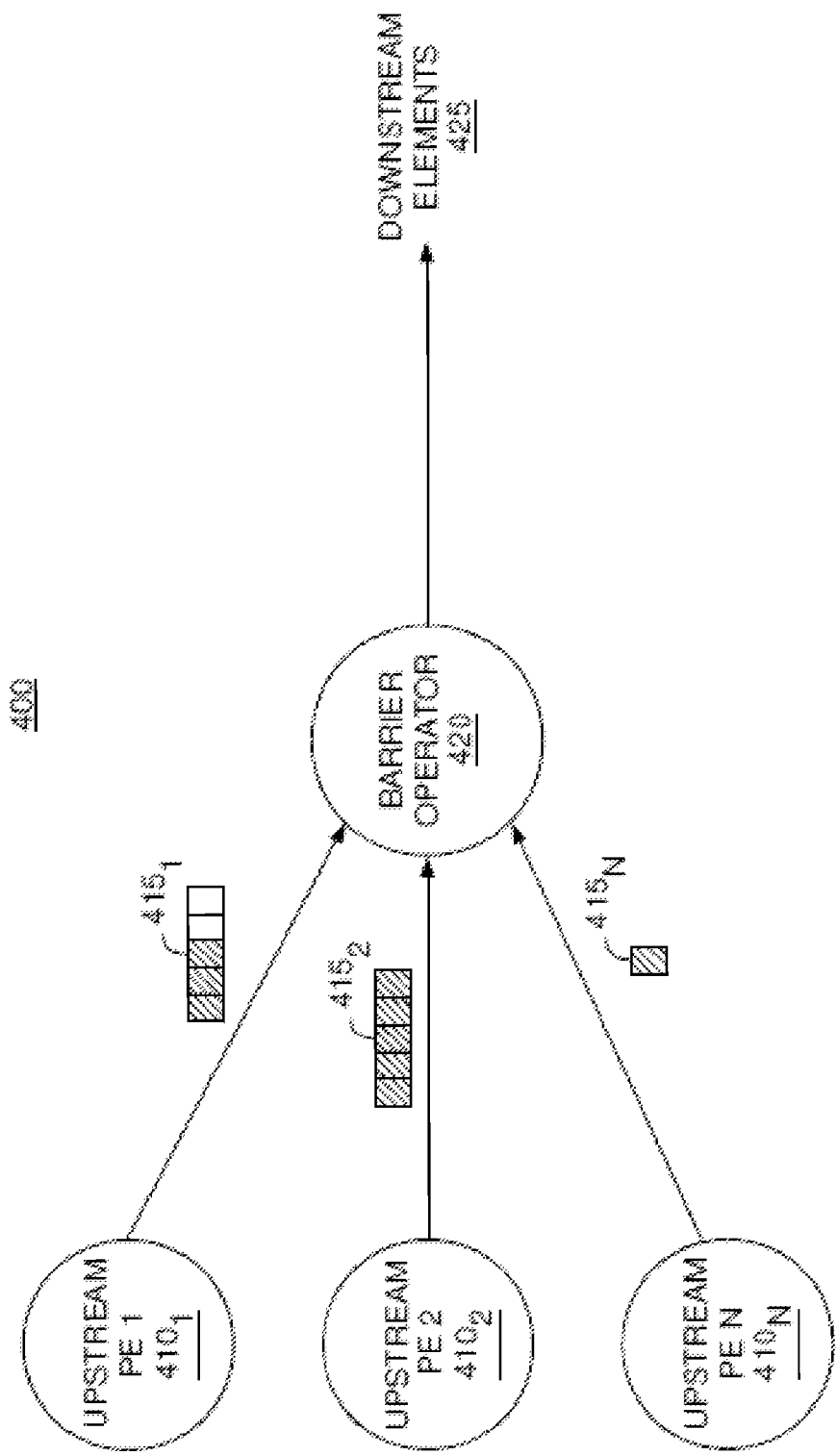

FIGS. 4A-4B illustrate a computing infrastructure configured to execute a stream computing application including a barrier operator, according to one embodiment described herein. FIG. 4A illustrates a system 400 containing a plurality of upstream processing elements $410_{1-N}$ each including at least one operator configured to send output data to a barrier operator 420. The barrier operator 420, in turn, is configured to join the received data from the upstream operators and to transmit the joined data to one or more downstream operators in the downstream processing elements 425. Additionally, the depicted example shows a current data buffer $415_{1-N}$ from each of the respective operators in the upstream processing elements $410_{1-N}$. That is, as discussed above, the barrier operator 420 may be configured to wait for a requisite amount of data from the upstream operators before joining the received data. Thus, as shown, the buffer $415_1$ indicates that the barrier operator 420 has received 3 of 5 tuples from operators on upstream processing element 1 $410_1$, the buffer $415_2$ indicates that 5 of 5 tuples have been received from operators on the upstream processing element 2 $410_2$ and the buffer $415_N$ indicates that 1 of 1 tuples have been received from operators on the upstream processing element N $410_N$.

The barrier operator 420 may also be configured to initiate one or more timeout conditions in addition to waiting on the data from the operators on the upstream processing elements $410_{1-N}$. For instance, one such timeout condition could be a timer configured to expire after a predetermined period of time. As another example, a timeout condition could be a threshold amount of backlog data from the upstream operators. For example, as shown by the buffer $415_2$, the requisite amount of data from the operators on the upstream PE 2 $410_2$ is 5 tuples of data. However, the barrier operator 420 could be configured to generate one or more substitute output values to satisfy the requisite amount of data for the operators on the upstream PE 1 $410_1$ (i.e., to generate two substitute tuples to fill the buffer $415_1$), upon determining that 20 tuples of data have been received from the operators on the upstream PE 2 $410_2$ and that this amount of data exceeds a threshold for backlog data. As yet another example of a timeout condition, the barrier operator 420 could receive a punctuation signal (e.g., initiated by a user), indicating that the barrier operator 420 should immediately join any data its received (generating substitute output values as needed) and transmit the joined data to operators on the one or more downstream processing elements 425.

For purposes of the current example, assume that the barrier operator 420 has determined that one of the initiated timeout conditions has been satisfied. However, as shown by the buffer $415_1$, the requisite amount of data from the operators on the upstream PE 1 $410_1$ has not yet been received. Upon determining the timeout condition is satisfied, the barrier operator 420 may generate a substitute output for the operators on the PE 1 $410_1$ and may join the substitute output with the received data from the operators on the other upstream PEs $410_{2-N}$. For example, the barrier operator 420 could generate the substitute output by averaging data from the three received tuples from the operators on PE 1 $410_1$ to generate two substitute tuples, thus giving the barrier operator 420 the requisite 5 tuples of data from the operators on PE 1 $410_1$. As another example, the barrier operator 420 could be configured to retrieve historical data describing previous outputs of the operators on the upstream PE 1 $410_1$ and could use the historical data to generate the two substitute tuples. Advantageously, doing so allows the barrier operator 420 to avoid undue delay in the stream computing application through the use of substitute output values.

FIG. 4B illustrates another example of a stream computing infrastructure configured with a barrier operator. As shown, the system 430 includes a plurality of upstream processing elements $440_{1-N}$ each having one or more operators configured to send output values to a barrier operator 450. In turn, the barrier operator 450 is configured to join the received output values and to transmit the joined data to one or more operators on downstream processing elements 455. Additionally, a plurality of data buffers $445_{1-N}$ are shown, with each data buffer $445_{1-N}$ corresponding to operator(s) on a respective one of the upstream processing elements $440_{1-N}$. For purposes of the current example, assume that the barrier operator is configured with a timeout condition that is satisfied when more than 10 tuples are received from operators on the upstream PE 1 $440_1$. As shown, the data buffer $445_1$ indicates that although the requisite number of tuples for the operators on the upstream PE 1 $440_1$ is 5 tuples, 11 tuples have been received from operators on the upstream PE 1 $440_1$. Additionally, the data buffer $445_N$ indicates that 3 of the 3 requisite tuples have been received from the operators on upstream PE $440_N$. However, the data buffer $445_2$ indicates that only 1 of the 4 requisite tuples have been received from the operators on the upstream PE 2 $440_2$.

As 11 tuples have been received from the operators on upstream PE 1 $440_1$, the barrier operator 450 could determine that the timeout condition of more than 10 tuples from PE 1 $440_1$ is satisfied. The barrier operator 450 could generate one or more output values using the received data and generating substitute output as needed, and could transmit the one or more output values to operators on the downstream processing elements 455. Accordingly, the barrier operator 450 could generate substitute output for operators on PE 2 $440_2$ to achieve the requisite number of tuples (i.e., 4 tuples) and could join the generated output with the already-received tuple from the operators on PE 2 $440_2$ (i.e., as shown in the data buffer $445_2$) along with the received data from the operators on PE 2 $440_1$ and PE N $440_N$ (i.e., as shown in the data buffers $445_1$ and $445_N$, respectively). The barrier operator 450 could then transmit the joined data to operators on downstream processing elements 455. Doing so advantageously allows the barrier operator 450 to trigger a join operation responsive to detecting a substantial amount of data amassing in the data buffer for one or more of the upstream operators, thereby avoiding a backlog of data accruing at the barrier operator 450.

Figure 5:
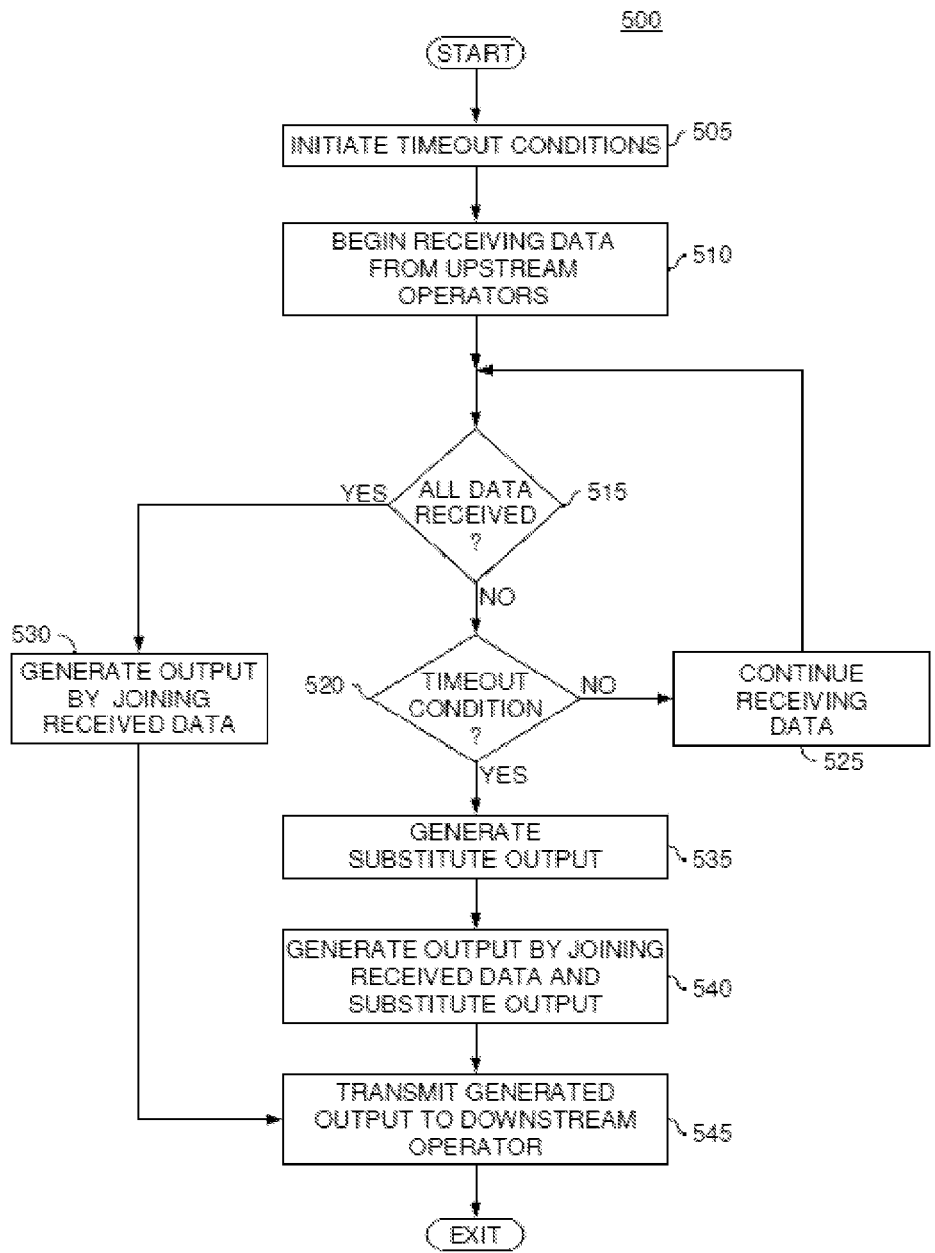
FIG. 5 is a flow diagram illustrating a method for providing an enhanced barrier operator, according to one embodiment described herein.

FIG. 5 is a flow diagram illustrating a method for providing an enhanced barrier operator, according to one embodiment described herein. As shown, the method 500 begins at step 505, where a barrier operator initiates one or more timeout conditions. Generally, the timeout conditions represent conditional logic. For instance, one example of a timeout condition is a timer configured to expire after some period of time. As another example, a timeout condition could be satisfied when a specified number of tuples have been received from a particular upstream processing element. Such a timeout condition could be used, for instance, to prevent a substantial backlog of data from accruing at the barrier operator. As yet another example, a timeout condition could be triggered when the barrier operator receives a punctuation signal, indicating that the barrier operator should immediately generate output data using whatever data it has already received.

The barrier operator then begins receiving data from operators on upstream processing elements (step 510). As discussed above, the barrier operator may be configured to join the output of the upstream operators into one or more output values and to transmit these output values to a downstream operator. Additionally, the barrier operator may be configured to wait for a requisite amount of data from each of the upstream operators before joining the data into output values. For example, the barrier operator could be configured to wait until 10 tuples of data are received from a first upstream operator and 5 tuples of data are received from a second upstream operator.

The barrier operator component 340 then determines whether the requisite amount of data has been received from all of the upstream operators (step 515). If so, the barrier operator generates one or more output values by joining the received data from the upstream operators (step 530). If instead the barrier operator component 340 determines that the requisite amount of data has not been received from at least one of the upstream operators, the barrier operator component 340 determines whether any of the timeout conditions are satisfied (step 520). If the barrier operator component 340 determines none of the timeout conditions are satisfied, the barrier operator continues receiving data from the upstream operators (step 525) and the method 500 returns to step 515.

Upon determining that at least one of the timeout conditions are satisfied, the barrier operator component 340 generates substitute output values for any upstream operators from which the requisite amount of data has not yet been received (step 535). As discussed above, the barrier operator component 340 could predictively generate the substitute output values based on data already received or previously received from the upstream operator. For instance, the barrier operator component 340 could be configured to calculate the substitute output by averaging the already-received values and/or historical values received from the operator. As another example, the barrier operator component 340 could be configured to detect patterns in the output data generated by the upstream operator and to predictively generate substitute output based on these patterns. For example, assume that the barrier operator component 340 determines that the upstream operator frequently outputs a particular tuple of data after outputting a series of other tuples. If the barrier operator component 340 determines that a barrier operator has received the series of other tuples and that a timeout condition has been satisfied before the requisite amount of data has been received, the barrier operator component 340 could generate the particular tuple as a substitute output for the upstream operator.

Upon generating the substitute output, the barrier operator joins the substitute output with any already received data from the upstream processing elements (step 540). As discussed herein, a unique identifier may also be added to the joined substitute output and received data. Once the barrier operator component 340 generates the joined output at step 530 or at step 540, the barrier operator component 340 transmits the joined output to one or more downstream processing elements (step 545), and the method 500 ends. Advantageously, doing so provides an enhanced barrier operator that helps avoid data backlogs and delays in the stream computing application through the use of timeout conditions and predictive generation of substitute output values.

Figure 6:
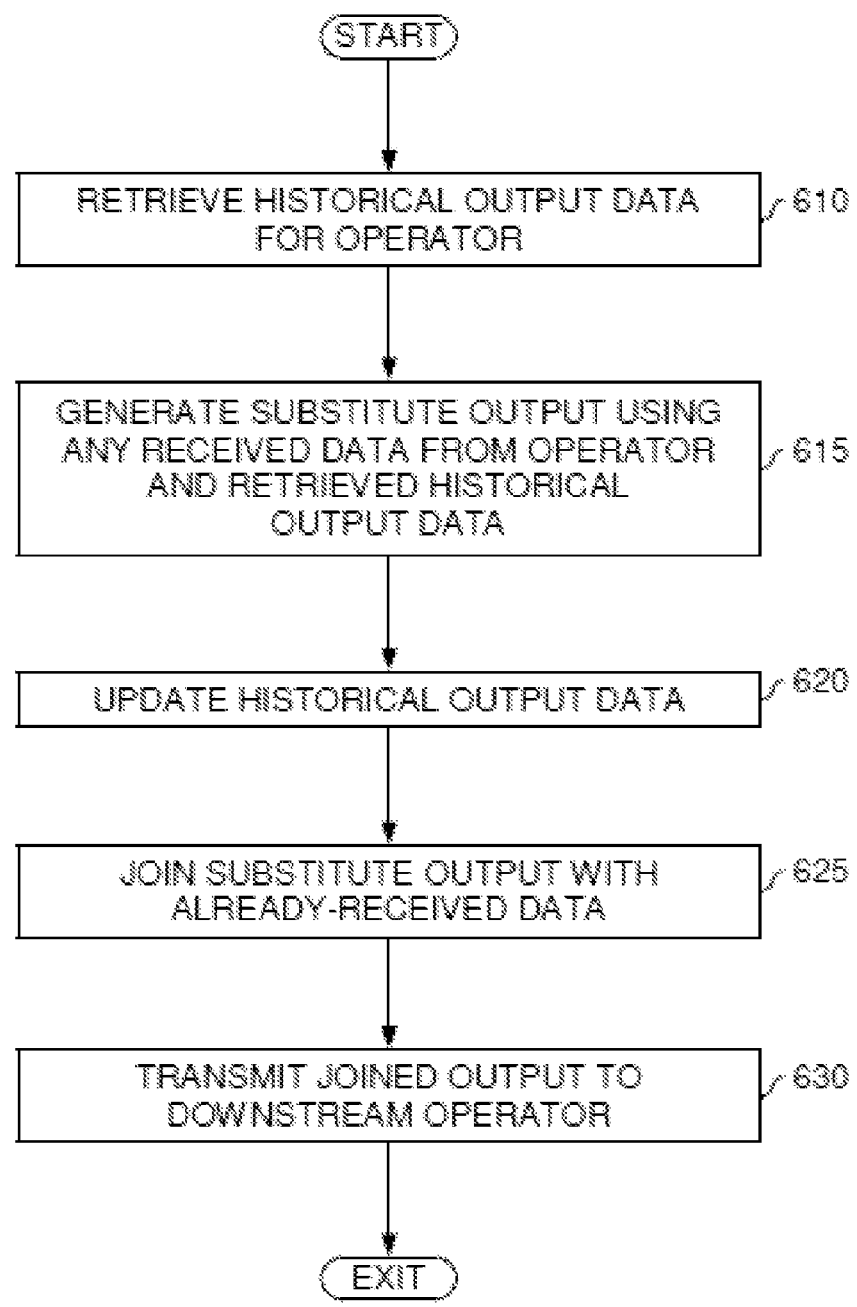
FIG. 6 is a flow diagram illustrating a method for providing substitute output for an operator, according to one embodiment described herein.

FIG. 6 is a flow diagram illustrating a method for providing substitute output for an operator, according to one embodiment described herein. As shown, the method 600 begins at step 610, where the barrier operator component 340 retrieves historical output data for an upstream operator. Such historical output data may include, for instance, data from tuples that the upstream operator has previously generated. Additionally, the historical output data may further specify information describing the previously generated tuples. In one embodiment, the historical output data describes pattern characteristics of output generated by the upstream operator. For example, the historical output data could specify that an operator routinely generates a particular tuple after generating one or more other tuples.

The barrier operator component 340 then generates one or more substitute output tuples using any already-received data from the upstream operator and the retrieved historical output data for the upstream operator (step 615). For instance, the barrier operator component 340 could analyze any already-received data from the upstream operator against the historical output data for the upstream operator to determine whether the already-received data matches any output patterns described in the historical output data. Upon determining that the already-received data does match an output pattern, the barrier operator component 340 could generate substitute output data to satisfy the requisite amount of data for the upstream operator based on the matching output pattern.

Additionally, the barrier operator component 340 updates the historical output data to include information (step 620). For instance, such an update could include the already-received data from the upstream operator. As another example, the update could include the substitute output that the barrier operator component 340 generated for the upstream operator. The barrier operator component 340 then joins the generated substitute output with any already-received data from the upstream operators (step 625). The barrier operator component 340 transmits the joined output to one or more downstream operators (step 630), and the method 600 ends.

Figure 7:
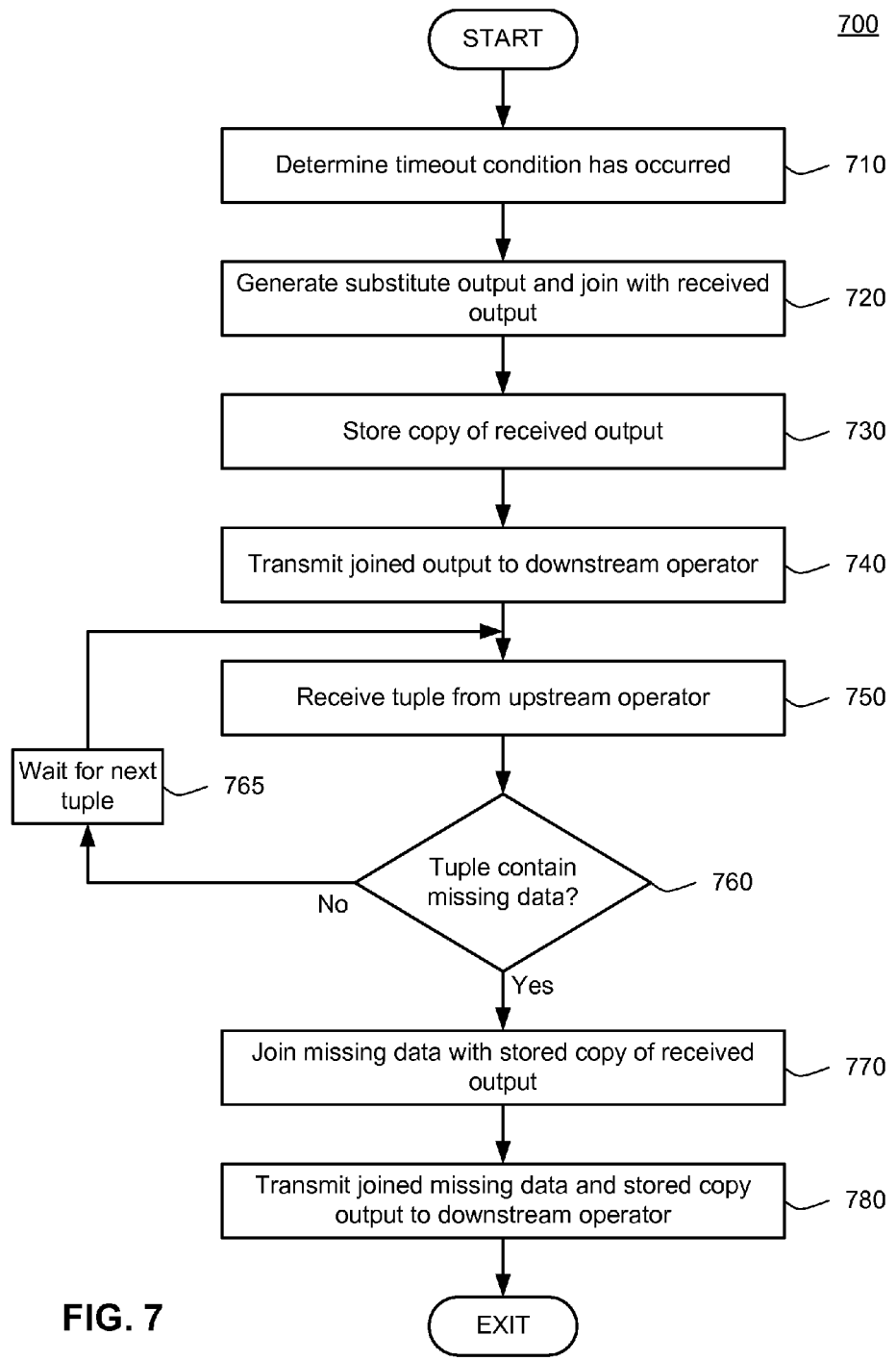
FIG. 7 is a flow diagram illustrating a method for rejoining missing data with the data it was originally intended to be joined with at a barrier operator, according to one embodiment described herein.

FIG. 7 is a flow diagram illustrating a method for rejoining missing data with the data it was originally intended to be joined with at a barrier operator. As shown, method 700 begins at step 710, where the barrier operator component 340 determines that a timeout condition has occurred. The barrier operator component 340 then generates a substitute output and joins the substitute output with output that has been received from upstream operators to create a barrier tuple output (step 720). The substitute output may contain a unique identifier or a unique identifier may be added to the joined data values. Additionally, the barrier operator component 340 stores a copy of the received output data values that were joined with substitute data values (step 730). The barrier operator component 340 transmits the joined output to one or more downstream operators (step 740).

Next, the barrier operator component 340 receives a tuple from an upstream operator (step 750). The barrier operator component 340 determines whether the tuple contains the missing data as described herein (step 760). If the tuple does not contain the missing data, the barrier operator component 340 waits for the next tuple (step 765). If the tuple contains the missing data, the barrier operator component 340 joins the missing data values with the stored copy of the received output values (step 770). This may also include adding an indicator to the values that indicate it contains previously missing output. The identifier may also be associated with a unique identifier added at step 720. The barrier operator component 340 transmits the joined missing data values and stored copy output values to one or more downstream operators (step 780) and the method 700 ends.

Figure 8:
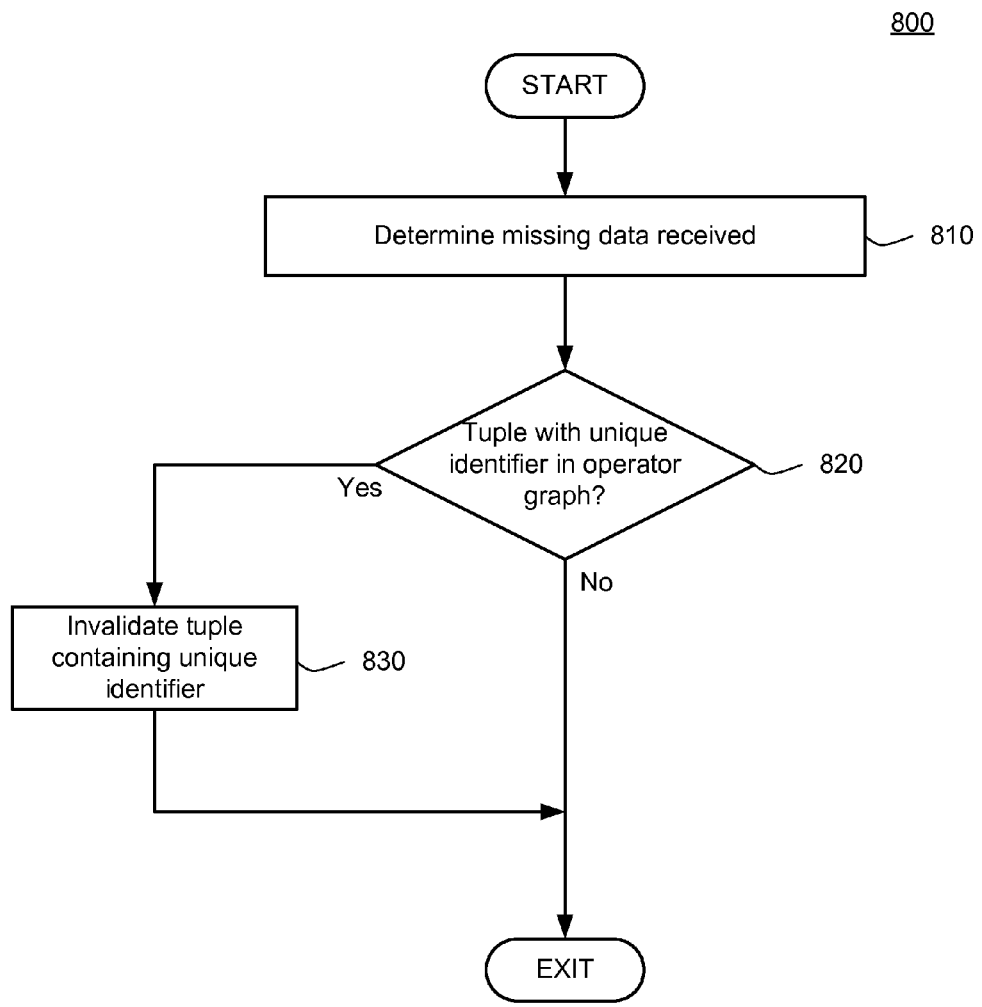
FIG. 8 is a flow diagram depicting a method for invalidating tuples containing substitute data, according to one embodiment described herein.

FIG. 8 is a flow diagram depicting a method for invalidating tuples containing substitute data. Method 800 begins at step 810, where a barrier operator determining that missing data has been received. In response, the streams manager determines whether a tuple containing a unique identifier associated with the missing data is in the operator graph (step 820). If a tuple with the unique identifier is not found in the operator graph, method 800 ends. If a tuple with the unique identifier is found, the tuple is invalidated (step 830) and the method 800 ends.

Figure 9:
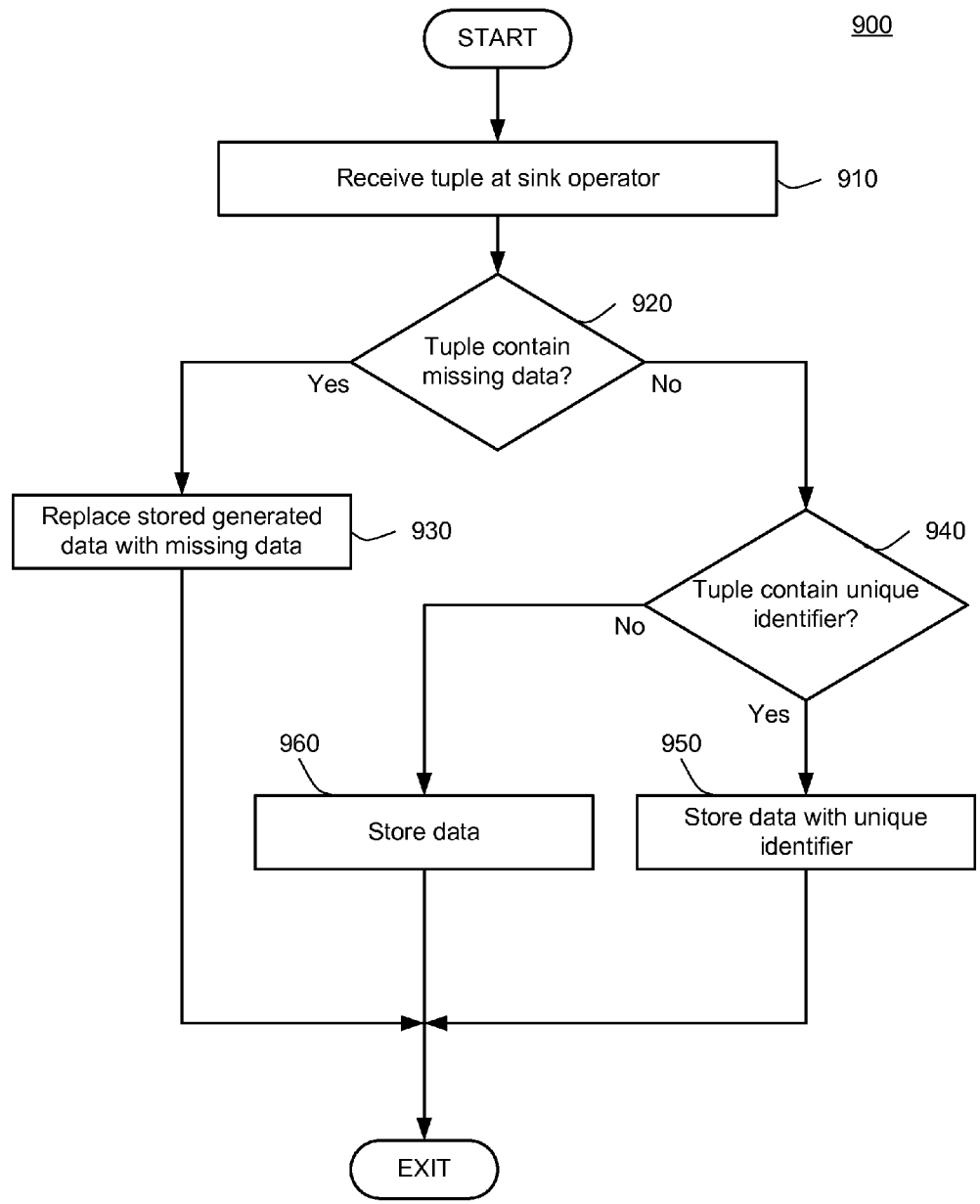
FIG. 9 is a flow diagram depicting a method for handling substitute data and previously missing data at a sink operator, according to one embodiment described herein.

FIG. 9 is a flow diagram depicting a method for handling substitute data and previously missing data at a sink operator. Method 900 begins at step 910 with a tuple being received by the sink operator. The sink operator determines whether the tuple contains previously missing data (step 920). This determining could be done in several ways. For example, an indicator may be added to tuples at the barrier operator which contain previously missing data and the sink operator may identify this indicator. In another example, the barrier operator may be configured to add the same unique identifier to a tuple containing the previously missing data as was added to the tuple containing substitute data. The sink operator may track unique identifiers and determine that the second tuple containing the unique identifier contains the previously missing data.

If the tuple contains previously missing data, the sink operator replaces generated data with the missing data (step 930) and method 900 ends. If the tuple does not contain previously missing data, the sink operator determines if the tuple contains a unique identifier (step 940). If the tuple contains a unique identifier, the sink operator stores the data from the tuple with the unique identifier (step 950) and method 900 ends. If the tuple does not contain a unique identifier, the data from the tuple is stored (step 960) and method 900 ends.

As used herein, a sink operator is an operator that takes input and writes data from the input into storage. For example, the sink operator may output data to disk storage such as a flat file or database. As discussed above, a sink operator may write a unique identifier to storage with the data from the input.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method for processing a stream of tuples, the method comprising:
    establishing an operator graph for a plurality of processing elements that each include a respective one or more operators configured to perform a respective one or more operations on tuples of streaming data, wherein the operator graph defines at least one execution path through the operators of the plurality of processing elements, and wherein a first processing element in the operator graph includes a barrier operator that joins output of a plurality of upstream operators included in the one or more of the plurality of processing elements;
    determining at least one timeout condition has occurred at the barrier operator;
    generating, in response to the determining at least one timeout condition has occurred at the barrier operator, substitute data tuple values for missing tuple output data from at least one of the plurality of upstream operators;
    generating a first barrier tuple output by joining the substitute data tuple values with received data tuple values from the plurality of upstream operators;
    storing a copy of the received data tuple values;
    receiving, at the barrier operator and after the storing of the copy of the received data tuple values, a set of one or more tuples;
    determining the set of one or more tuples comprises the missing tuple output data; and
    generating a second barrier tuple output by joining the missing tuple output data values with the copy of the received data tuple values.

2. The method of claim 1, further comprising:
    identifying, based on the determining the set of one or more tuples comprises the missing tuple output data, the first barrier tuple output at a downstream operator; and
    invalidating the barrier tuple output.

3. The method of claim 2, wherein the generating the first barrier tuple output further comprises assigning a unique identifier to the first barrier tuple output, and wherein the identifying the barrier tuple output at the downstream operator comprises identifying the unique identifier in the first barrier tuple output.

4. The method of claim 1, wherein the generating the first barrier tuple output further comprises assigning a unique identifier to the first barrier tuple output, the method further comprising:
   receiving, at a sink operator, the first barrier tuple output;
   storing, at the sink operator, data from the first barrier tuple output;
   receiving, at the sink operator, the second barrier tuple output; and
   replacing the stored data from the first barrier tuple output with data from the second barrier tuple output.

5. The method of claim 4, wherein the generating the first barrier tuple output further comprises assigning a unique identifier to the first barrier tuple output, and wherein the data from the first barrier tuple output is stored with the unique identifier, and wherein the generating the second barrier tuple output further comprises assigning the unique identifier to the second barrier tuple output; and wherein the replacing the stored data from the first barrier tuple output occurs in response to determining the unique identifier from the second barrier tuple output matches the unique identifier with the data from the first barrier tuple output.

6. A system for processing a stream of tuples comprising:
   a plurality of processing elements to receive the stream of tuples;
   two or more processors; and
   a memory containing an application that, when executed, causes at least one of the two or more processors to perform a method comprising:
      establishing an operator graph for the plurality of processing elements that each include a respective one or more operators configured to perform a respective one or more operations on tuples of streaming data, wherein the operator graph defines at least one execution path through the operators of the plurality of processing elements, and wherein a first processing element in the operator graph includes a barrier operator that joins output of a plurality of upstream operators included in the one or more of the plurality of processing elements;
      determining at least one timeout condition has occurred at the barrier operator;
      generating, in response to the determining at least one timeout condition has occurred at the barrier operator, substitute data tuple values for missing tuple output data from at least one of the plurality of upstream operators;
      generating a first barrier tuple output by joining the substitute data tuple values with received data tuple values from the plurality of upstream operators;
      storing a copy of the received data tuple values;
      receiving, at the barrier operator and after the storing of the copy of the received data tuple values, a set of one or more tuples;
      determining the set of one or more tuples comprises the missing tuple output data; and
      generating a second barrier tuple output by joining the missing tuple output data values with the copy of the received data tuple values.

7. The system of claim 6, wherein the method further comprises:
   identifying, based on the determining the set of one or more tuples comprises the missing tuple output data, the first barrier tuple output at a downstream operator; and
   invalidating the barrier tuple output.

8. The system of claim 7, wherein the generating the first barrier tuple output further comprises assigning a unique identifier to the first barrier tuple output, and wherein the identifying the barrier tuple output at the downstream operator comprises identifying the unique identifier in the first barrier tuple output.

9. The system of claim 6, wherein the generating the first barrier tuple output further comprises assigning a unique identifier to the first barrier tuple output, the method further comprising:
   receiving, at a sink operator, the first barrier tuple output;
   storing, at the sink operator, data from the first barrier tuple output;
   receiving, at the sink operator, the second barrier tuple output; and
   replacing the stored data from the first barrier tuple output with data from the second barrier tuple output.

10. The system of claim 9, wherein the generating the first barrier tuple output further comprises assigning a unique identifier to the first barrier tuple output, and wherein the data from the first barrier tuple output is stored with the unique identifier, and wherein the generating the second barrier tuple output further comprises assigning the unique identifier to the second barrier tuple output; and wherein the replacing the stored data from the first barrier tuple output occurs in response to determining the unique identifier from the second barrier tuple output matches the unique identifier with the data from the first barrier tuple output.

11. A computer program product for processing a stream of tuples, the computer program product comprising a computer readable storage medium having program code embodied therewith, the program code executable by one or more processors to cause the one or more processors to perform a method comprising:
   establishing an operator graph for a plurality of processing elements that each include a respective one or more operators configured to perform a respective one or more operations on tuples of streaming data, wherein the operator graph defines at least one execution path through the operators of the plurality of processing elements, and wherein a first processing element in the operator graph includes a barrier operator that joins output of a plurality of upstream operators included in the one or more of the plurality of processing elements;
   determining at least one timeout condition has occurred at the barrier operator;
   generating, in response to the determining at least one timeout condition has occurred at the barrier operator, substitute data tuple values for missing tuple output data from at least one of the plurality of upstream operators;
   generating a first barrier tuple output by joining the substitute data tuple values with received data tuple values from the plurality of upstream operators;
   storing a copy of the received data tuple values;
   receiving, at the barrier operator and after the storing of the copy of the received data tuple values, a set of one or more tuples;
   determining the set of one or more tuples comprises the missing tuple output data; and generating a second barrier tuple output by joining the missing tuple output data values with the copy of the received data tuple values.

12. The computer program product of claim 11, wherein the method further comprises:

identifying, based on the determining the set of one or more tuples comprises the missing tuple output data, the first barrier tuple output at a downstream operator; and invalidating the barrier tuple output.

13. The computer program product of claim 12, wherein the generating the first barrier tuple output further comprises assigning a unique identifier to the first barrier tuple output, and wherein the identifying the barrier tuple output at the downstream operator comprises identifying the unique identifier in the first barrier tuple output.

14. The computer program product of claim 11, wherein generating the first barrier tuple output further comprises assigning a unique identifier to the first barrier tuple output, and wherein the method further comprises:

receiving, at a sink operator, the first barrier tuple output;

storing, at the sink operator, data from the first barrier tuple output;

receiving, at the sink operator, the second barrier tuple output; and replacing the stored data from the first barrier tuple output with data from the second barrier tuple output.

15. The computer program product of claim 14, wherein the generating the first barrier tuple output further comprises assigning a unique identifier to the first barrier tuple output, and wherein the data from the first barrier tuple output is stored with the unique identifier, and wherein the generating the second barrier tuple output further comprises assigning the unique identifier to the second barrier tuple output; and wherein the replacing the stored data from the first barrier tuple output occurs in response to determining the unique identifier from the second barrier tuple output matches the unique identifier with the data from the first barrier tuple output.

* * * * *